(12) United States Patent
Liang (10) Patent No.: US 12,181,248 B2
(45) Date of Patent: Dec. 31, 2024

(54) SIGHT ADJUSTING MECHANISM

(71) Applicants: SINTAI OPTICAL (SHENZHEN) CO., LTD., Guangdong (CN); ASIA OPTICAL CO., INC., Taichung (TW)

(72) Inventor: Shang-yung Liang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 532 days.

(21) Appl. No.: 17/586,744

(22) Filed: Jan. 27, 2022

(65) Prior Publication Data

US 2022/0244521 A1 Aug. 4, 2022

(30) Foreign Application Priority Data

Feb. 4, 2021 (CN) .......................... 202110153019.X (51) Int. Cl.
F41G 1/38 (2006.01)
F41G 1/26 (2006.01)
F41G 11/00 (2006.01)

(52) U.S. Cl.
CPC .............. *F41G 11/001* (2013.01); *F41G 1/26* (2013.01); *F41G 1/38* (2013.01)

(58) Field of Classification Search
CPC .............. F41G 1/26; F41G 1/38; G02B 23/16
USPC ................................... 42/111, 119, 125, 135
See application file for complete search history.

(56) References Cited

U.S. PATENT DOCUMENTS

| 10,190,848 | B2 * | 1/2019 | VanBecelaere | ........ | G02B 7/004 |
| 10,684,098 | B2 * | 6/2020 | Tang | ........................ | F41G 1/545 |
| 11,105,587 | B2 * | 8/2021 | Hamilton | .................. | F41G 1/38 |
| 2007/0137089 | A1 | 6/2007 | William, III et al. | | |
| 2013/0312310 | A1 | 11/2013 | Geller et al. | | |
| 2016/0290763 | A1 | 10/2016 | Tang et al. | | |
| 2020/0166308 | A1 | 5/2020 | Chou et al. | | |

FOREIGN PATENT DOCUMENTS

| CN | 108253842 A | 7/2018 |
| CN | 111623669 A | 9/2020 |
| TW | 201445106 A | 12/2014 |
| TW | 201823660 A | 7/2018 |

OTHER PUBLICATIONS

Chinese Office Action issued in corresponding Chinese Patent Application No. 202110153019.X dated Dec. 27, 2023, pp. 1-6.

* cited by examiner

*Primary Examiner* — Reginald S Tillman, Jr.
(74) *Attorney, Agent, or Firm* — PV IP PC; Wei Te Chung (57) ABSTRACT

A sight adjusting mechanism includes an adjusting knob, an adjusting ring member, an adjusting bolt and a base. An upper-side portion of the adjusting bolt enters a through hole of the adjusting ring member to couple with the adjusting ring member. A lower-side portion of the adjusting bolt enters a through hole of the base to couple with the base. Thus, the adjusting bolt can only move along an axis. The mechanism is implemented without mechanical feedback, and thus rotating angles are improved with great precision. Also, the mechanism includes a limiting member disposed in a penetrating hole of the adjusting knob and a positioning ring mounted on the adjusting ring member. By cooperation of the limiting member and the positioning ring, an angle at which the adjusting knob can rotate is defined. A fine adjustment and a quick adjustment of a sight point are implemented.

20 Claims, 7 Drawing Sheets

SIGHT ADJUSTING MECHANISM

CROSS REFERENCE TO RELATED APPLICATION

This application claims priority to China Patent Application No. 202110153019.X, filed on Feb. 4, 2021, which is incorporated herein by reference in its entirety.

TECHNICAL FIELD

The present application relates to a sight adjusting mechanism, and more particularly to a sight adjusting mechanism without tactile or mechanical feedback.

BACKGROUND

Sighting devices are generally deployed on shooting equipments for adjustment of an impact point. The sighting device usually includes an objective lens unit, an ocular lens unit and a magnification unit disposed between the objective lens unit and the ocular lens unit and further includes an impact-point compensating mechanism for adjusting the position of the magnification unit in a vertical direction (and a horizontal direction). The sighting device is usually equipped with an elevation impact-point compensating mechanism for adjusting a height position of the magnification unit. For high-end products, the elevation impact-point compensating mechanism and a windage impact-point compensating mechanism for adjusting a horizontal position of the magnification unit are equipped.

Figure 1:
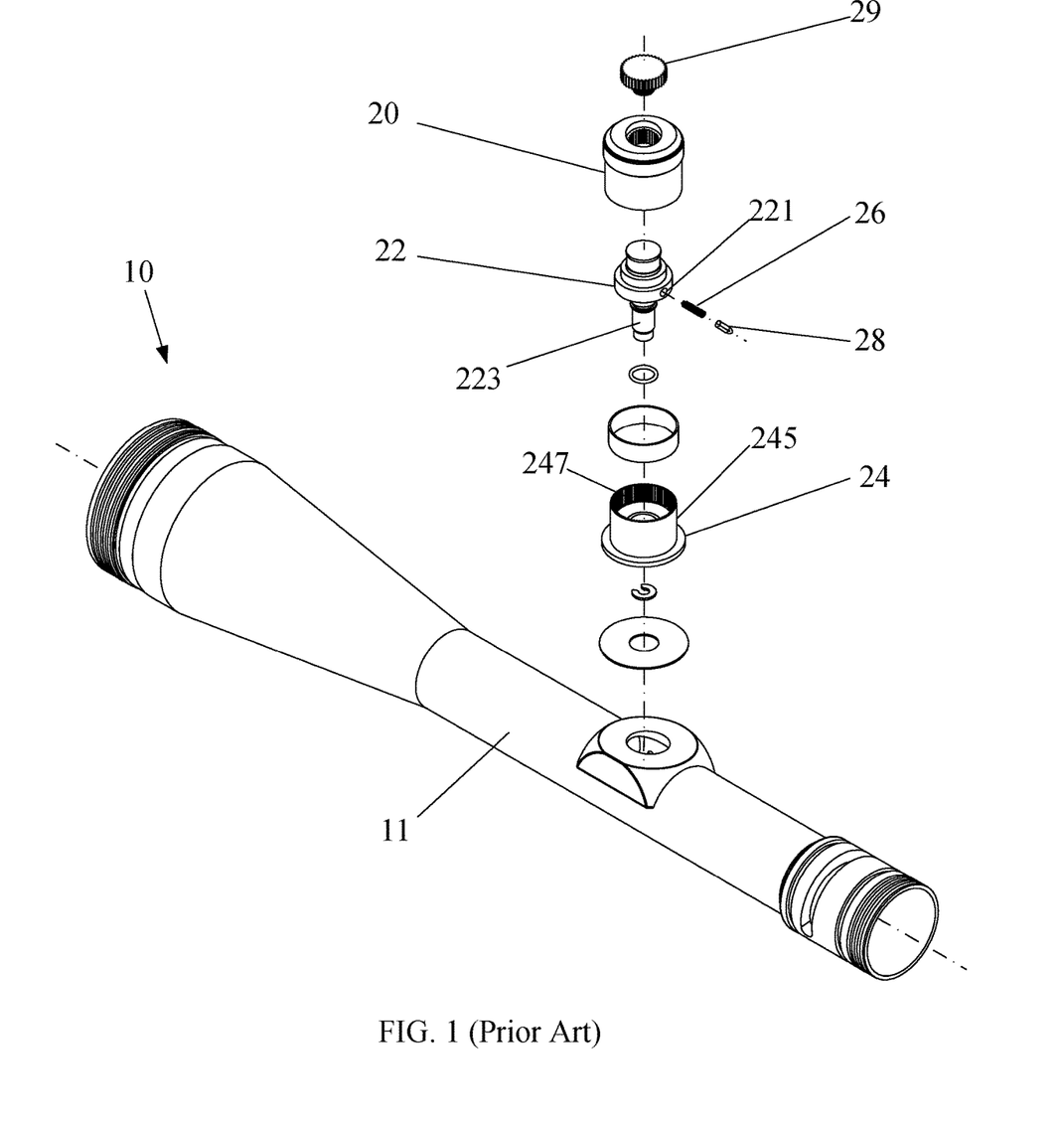
FIG. 1 is a schematic diagram showing a conventional sighting device.

Please refer to FIG. 1, which shows a conventional sighting device 10. The conventional sighting device 10 includes a body 11 and an impact-point compensating mechanism fastened to the body 11. The impact-point compensating mechanism includes an adjusting knob 20, an adjusting bolt 22, a base 24, a spring 26 and a bullet head 28. The adjusting knob 20 and the adjusting knob 22 are fastened together by a screw 29, and thus a linkage between the adjusting knob 20 and the adjusting bolt 22 is formed. The base 24 is fastened to the body 11 of the sighting device 10. The adjusting bolt 22 has a side wall and a receiving slot 221 provided on the side wall for receiving the spring 26 and the bullet head 28 sequentially. One end of the bullet head 28 abuts on the spring 26 and the other end of the bullet head 28 is protruded from the side wall of the adjusting bolt 22. The base 24 has a hollow cylindrical member 245. A screw thread 247 is provided on an inner face of the hollow cylindrical member 245. When the adjusting knob 20 drives the adjusting bolt 22 to rotate, the bullet head 28 moves along the screw thread 247 such that the adjusting knob 22 moves upward and downward with respect to the base 24. The adjusting bolt 22 has a lower end portion 223. An opening is provided at the center of the base 24. The lower end portion 223 of the adjusting bolt 22 goes through the opening of the base 24. When the adjusting knob 20 drives the adjusting bolt 22 to move upward and downward, the lower end portion 223 of the adjusting bolt 22 can push against the magnification unit inside the sighting device 10 so as to change its height position for adjustment of an impact point.

Figure 2:
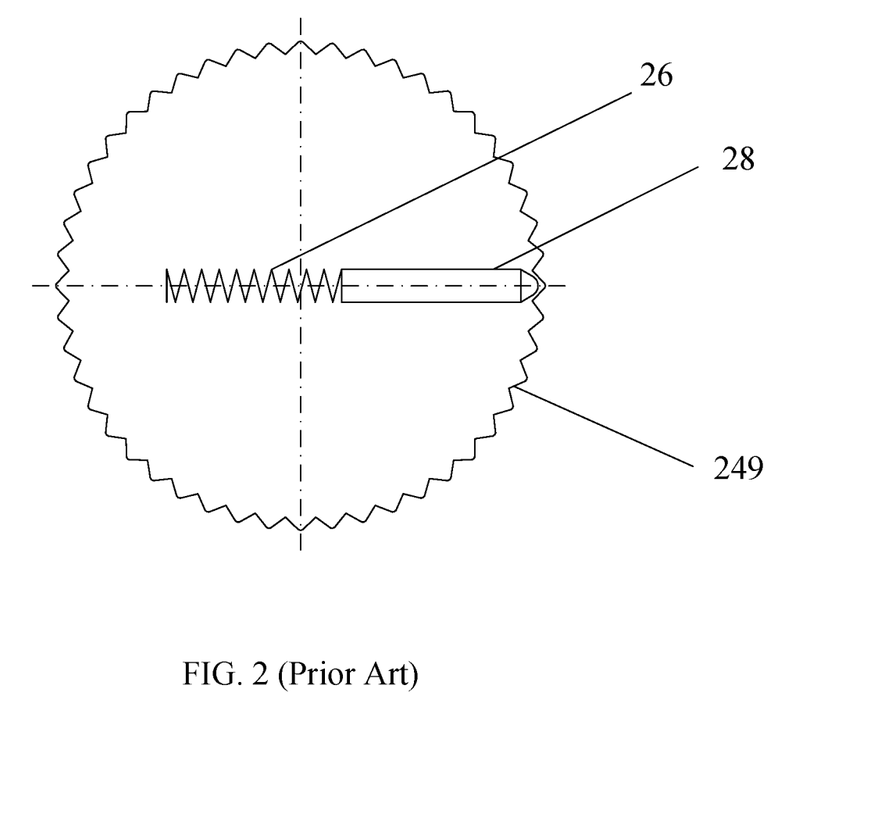
FIG. 2 is a diagram showing a position relationship between a bullet head, a spring and a tooth portion on an inner wall of a base of a conventional sighting device.

As shown in FIG. 2, a tooth portion 249 is provided on an inner wall of the base 24. Both the screw thread 247 and the tooth portion 249 are disposed on the inner wall of the base 24. The tooth portion 249 has a plurality of columnar structures extending along a radial direction. These columnar structures are located parallel to each other and are disposed on the inner wall with a ring-type arrangement. The screw thread 247 extends across these columnar structures. When a user rotates the adjusting knob 20, the adjusting knob 20 drives the adjusting knob 22 to rotate such that the bullet head 28 moves along the inner wall of the base 24. Meanwhile, the spring 26 pushes against the bullet head 28 such that the bullet head 28 contacts the tooth portion 249 on the inner wall of the base 24 and tactile feedback is generated accordingly. With help of the tactile feedback, the user can adjust the rotation speed of the adjusting knob 20.

The precision of adjustment of the impact point carried out by the sighting device is related to a minimum amount of rotation angle of the adjusting knob of the impact-point compensating mechanism. In this tactile-feedback design, the size of the bullet head needs to match the size of the tooth on the inner wall of the base. In order to satisfy the need of precision of the rotation angle, it needs to increase the number of teeth of the tooth portion on the inner wall of the base. However, if the number of teeth of the tooth portion on the inner wall of the base is too large, it may make the tactile feedback less notable and it may not be able to provide a better user experience. Under a requirement of same precision, if the size of the bullet head is reduced so as to enhance the tactile feedback, this may instead aggregate the wear between the tooth portion on the inner wall of the base and the bullet head and affect the service life. For current sighting device manufacturing processes, the number of teeth of the tooth portion on the inner wall of the base can increase to 100 teeth at most, and the precision of rotation angle corresponding to each tooth is 360/100=3.6 degrees.

The conventional sighting device has the following technical problems: (1) the tactile-feedback design makes the precision of rotation angle of the adjusting knob of the impact-point compensating mechanism difficult to be further improved, and it is difficult for the need of accuracy of the impact-point adjustment to be satisfied; (2) the service life of the sighting device is affected and the tactile feedback is less notable as usage time increases since tooth wear between the bullet head and the tooth portion on the inner wall of the base is easily to be caused due to the contact between the bullet head and the tooth portion.

SUMMARY

An objective of the present application is to provide a sight adjusting mechanism for avoiding above problems in the conventional skills.

To achieve above objective, the present application provides a sight adjusting mechanism, including:
  an adjusting knob, having a penetrating hole;
  an adjusting ring member, having a first through hole, wherein the adjusting knob couples with the adjusting ring member by means of a fixing fastener;
  a base, having a second through hole;
  an adjusting bolt, including an upper-side portion and a lower-side portion, wherein the upper-side portion of the adjusting bolt enters the first through hole of the adjusting ring member to couple with the adjusting ring member and the lower-side portion of the adjusting bolt enters the second through hole of the base to couple with the base such that the adjusting bolt can only move along an axis during the adjusting knob rotates;
  a limiting member, disposed in the penetrating hole of the adjusting knob; and
  a positioning ring, mounted on the adjusting ring member, wherein the limiting member is operable at a first position and a second position along the direction of the axis, the limiting member connects with the positioning ring and the adjusting knob is restricted to rotate within a range of predetermined angle when the limiting member is located at the first position, and the limiting member departs from the positioning ring and the adjusting knob rotates in an angular range that is greater than the predetermined angle when the limiting member is located at the second position.

According to an embodiment of the present application, the upper-side portion of the adjusting bolt enters the first through hole of the adjusting ring member to be screwed together with the adjusting ring member, and the lower-side portion of the adjusting bolt enters the second through hole of the base to be engaged with the base;

wherein the adjusting ring member has a ring slot, the adjusting knob couples with the adjusting ring member by means of the fixing fastener that abuts on the ring slot of the adjusting ring member, and a linkage is formed between the adjusting knob and the adjusting ring member;

wherein when the adjusting knob drives the adjusting ring member to rotate, the adjusting knob and the limiting member have fixed spacing in the direction of the axis with respect to the base;

wherein an external surface of the upper-side portion of the adjusting bolt is adaptive to an inner wall of the adjusting ring member with matched threads; and wherein a cross-section of the lower-side portion of the adjusting bolt is a polygon, which is adaptive to a contour of the second through hole of the base.

According to an embodiment of the present application, a spacing between the adjusting knob and the base along the direction of the axis is fixed; and the predetermined angle is less than or equal to 360 degrees.

According to an embodiment of the present application, the sight adjusting mechanism further includes:

a stop ring, disposed between the limiting member and the positioning ring, wherein the limiting member includes an upper end portion and a lower end portion, the lower end portion is disposed in the stop ring, and wherein when the limiting member operates along the direction of the axis, the first position is indicated by a situation that the lower end portion of the limiting member is protruded from the stop ring, and at the first position the limiting member connects with the positioning ring; conversely, the second position is indicated by a situation that the lower end portion of the limiting member is not protruded from the stop ring, and at the second position the limiting member departs from the positioning ring.

According to an embodiment of the present application, the limiting member further has a middle end portion located between the upper end portion and the lower end portion, the middle end portion has a first connection part, the penetrating hole includes an upper segment and a lower segment, the lower segment has a second connection part, the middle end portion of the limiting member connects with the lower segment of the penetrating hole, and wherein the first connection part is only allowed to be operatively moved along the direction of the axis within the range of the second connection part such that the middle end portion of the limiting member keeps within the range of the lower segment of the penetrating hole without departing from the penetrating hole when the limiting member is operatively moved along the direction of the axis.

According to an embodiment of the present application, an outer radius of the middle end portion of the limiting member is greater than the outer radius of the upper end portion and the lower end portion and an inner radius of the stop ring, wherein the first connection part is a first thread segment, wherein the second connection part is a second thread segment, and wherein the first thread segment is allowed to be operatively moved along the direction of the axis within the range of the second thread segment such that the limiting member keeps between the lower segment of the penetrating hole and the stop ring when the limiting member operates along the direction of the axis.

According to an embodiment of the present application, the sight adjusting mechanism further includes:

a circuit board, disposed on the upper-side portion of the adjusting bolt;

a magnetic sensor, disposed on the circuit board; and a magnetic component, disposed on an inner face of the adjusting knob, wherein when the rotation of the adjusting knob drives the adjusting bolt to move, relative position between the magnetic sensor on the circuit board and the magnetic component is changed such that the magnetic sensor senses a change of magnetic field of the magnetic component.

According to an embodiment of the present application, the positioning ring has a positioning slot, the positioning slot defines the range of predetermined angle within which the adjusting knob is rotatable, and wherein when the position of the limiting member falls in the positioning slot of the positioning ring, the limiting member connects with the positioning ring; when the position of the limiting member is out of the positioning slot of the positioning ring, the limiting member departs from the positioning ring.

According to an embodiment of the present application, the sight adjusting mechanism further includes:

a limiting fastener, extending to the ring slot of the adjusting ring member, wherein a gap exists between the limiting fastener and a wall of the ring slot, and the limiting fastener is configured to limit the movement of the adjusting knob such that the rotation of the adjusting knob is kept on the adjusting ring member.

According to an embodiment of the present application, the adjusting ring member has a ring flange, the base receives the ring flange of the adjusting ring member, the positioning ring has a positioning flange, the positioning ring abuts on the ring flange of the adjusting ring member, and the sight adjusting mechanism further includes:

a first retaining ring, abutting on the positioning flange of the positioning ring; and a second retaining ring, disposed between the base and the first retaining ring.

In the sight adjusting mechanism of the present application, the upper-side portion of the adjusting bolt enters the first through hole of the adjusting ring member to couple with the adjusting ring member and the lower-side portion of the adjusting bolt enters the second through hole of the base to couple with the base such that the adjusting bolt can only move along an axis, thereby implementing a sight adjusting mechanism without tactile or mechanical feedback. Furthermore, the limiting member is operable at a first position and a second position along the direction of the axis. When the limiting member is located at the first position, the adjusting knob is restricted to rotate within a range of predetermined angle and this is beneficial for a fine adjustment of sight point. When the limiting member is located at the second position, the adjusting knob rotates in an angular range that is greater than the predetermined angle and this allows the sight point to be quickly adjusted. Compared to conventional sighting devices, the sight adjusting mechanism of the present application has the following advantages: (1) the no-tactile-feedback design greatly improves the precision of rotation angle of the adjusting knob of the sight adjusting mechanism, and the need of accuracy of sight adjustment is satisfied; (2) the sighting device can have a longer service life since tooth wear occurred between a bullet head and an inner wall of the base in the conventional skills does not happen; and (3) a fine adjustment of sight point and a quick adjustment for large scale are implemented.

| 10: sighting device | 11: body |
| 20: adjusting knob | 22: adjusting bolt |
| 24: base | 26: spring |
| 28: bullet head | 29: screw |
| 30: sighting device | 31: body |
| 32: sight adjusting mechanism | 33: objective lens unit |
| 34: ocular lens unit | 42: adjusting knob |
| 44: adjusting bolt | 46: adjusting ring member |
| 48: base | 50: fixing fastener |
| 52: magnetic component | 54: circuit board |
| 56: magnetic sensor | 58: limiting member |
| 60: positioning ring | 62: first retaining ring |
| 64: second retaining ring | 66: stop ring |
| 68: limiting fastener | 221: receiving slot |
| 223: lower-side portion | 245: hollow cylindrical member |
| 247: screw thread | 249: tooth portion |
| 320: axis | 422: penetrating hole |
| 420: second connection part | 426: fixing fastener lockhole |
| 427: limiting fastener lockhole | 428: upper segment |
| 429: lower segment | 441: upper-side portion |
| 442: lower-side portion | 460: first through hole |
| 462: ring slot | 465: ring flange |
| 480: second through hole | 580: first connection part |
| 582: upper end portion | 584: lower end portion |
| 586: middle end portion | 602: positioning slot |
| 605: positioning flange | |

DETAILED DESCRIPTION

To make the objectives, technical schemes, and effects of the present application more clear and specific, the present application is described in further detail below with reference to embodiments in accompanying with the drawings. It should be understood that the specific embodiments described herein are merely for explaining the present application, the term "embodiment" used in the context means an example, instance or illustration, and the present application is not limited thereto. Additionally, in the appended figures, elements with similar or the same structures or functions are indicated by same reference numbers.

Figure 3:
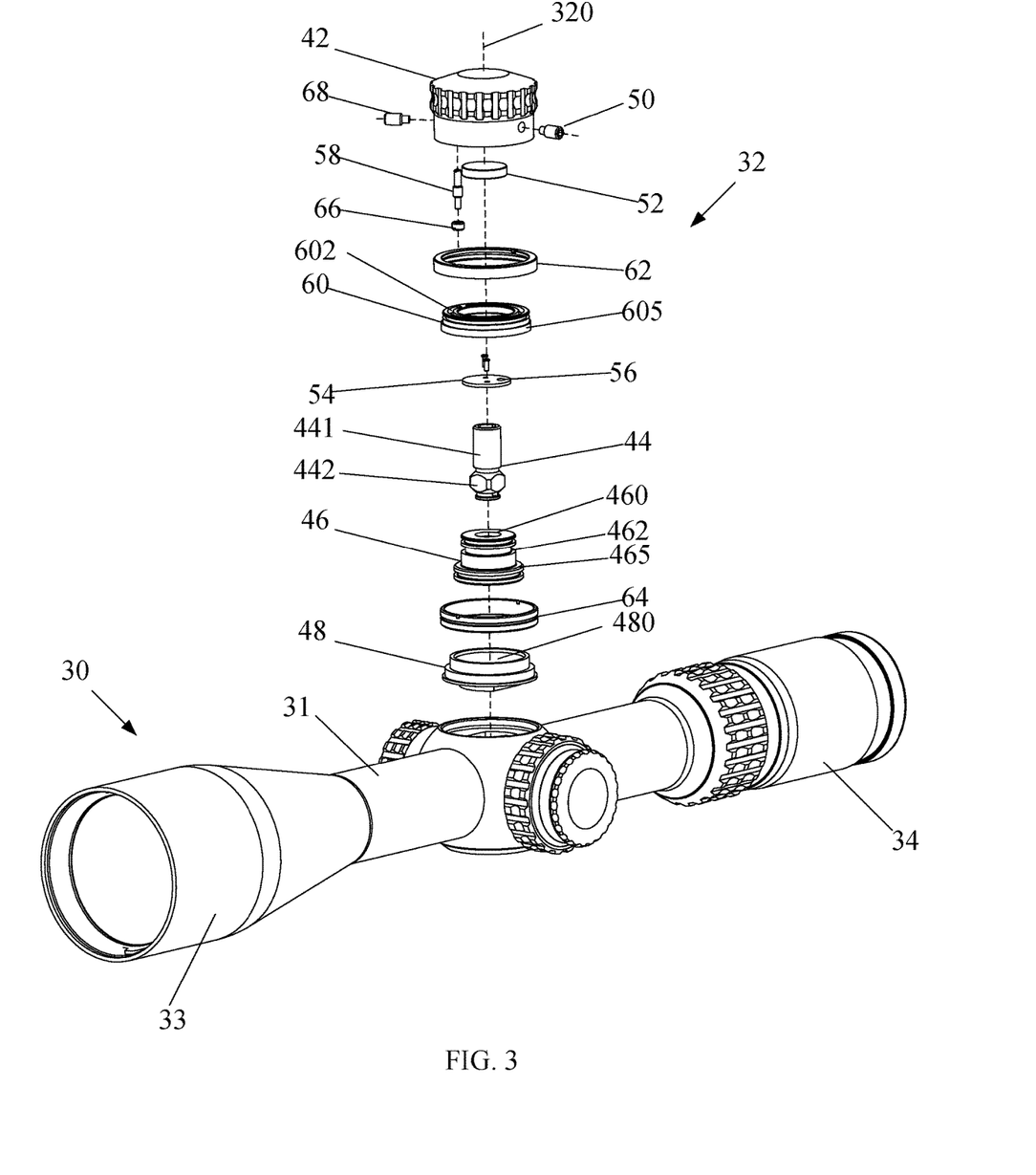
FIG. 3 is a schematic diagram showing a sighting device of the present application.

Please refer to FIG. 3, which illustrates a sighting device 30 of the present application. The sighting device 30 of the present application includes a body 31 and a sight adjusting mechanism 32 disposed on the body 31. In FIG. 3, the sight adjusting mechanism 32 is presented by an explored diagram. The sighting device 30 further includes an objective lens unit 33, an ocular lens unit 34, and a magnification unit (not shown). The magnification unit is disposed inside the body 31 and is located between the objective lens unit 33 and the ocular lens unit 34. The sight adjusting mechanism 32 is configured to adjust the position of the magnification unit for implementing a sight adjustment, such as an adjustment of an impact point. For example, the sight adjusting mechanism 32 is an elevation sight adjusting mechanism for adjusting a height position of the magnification unit; or the sight adjusting mechanism 32 is a windage sight adjusting mechanism for adjusting a horizontal position of the magnification unit. The sighting device 30 may be equipped only with the elevation sight adjusting mechanism for adjusting the pitch angle of the magnification unit or may be equipped with both the elevation sight adjusting mechanism and the windage sight adjusting mechanism for adjusting the position of the magnification unit in a vertical direction and a horizontal direction. In one possible implementation, the sighting device 30 is for sight adjustment and can be deployed on, but is not limited to, a shooting equipment.

Figure 4:
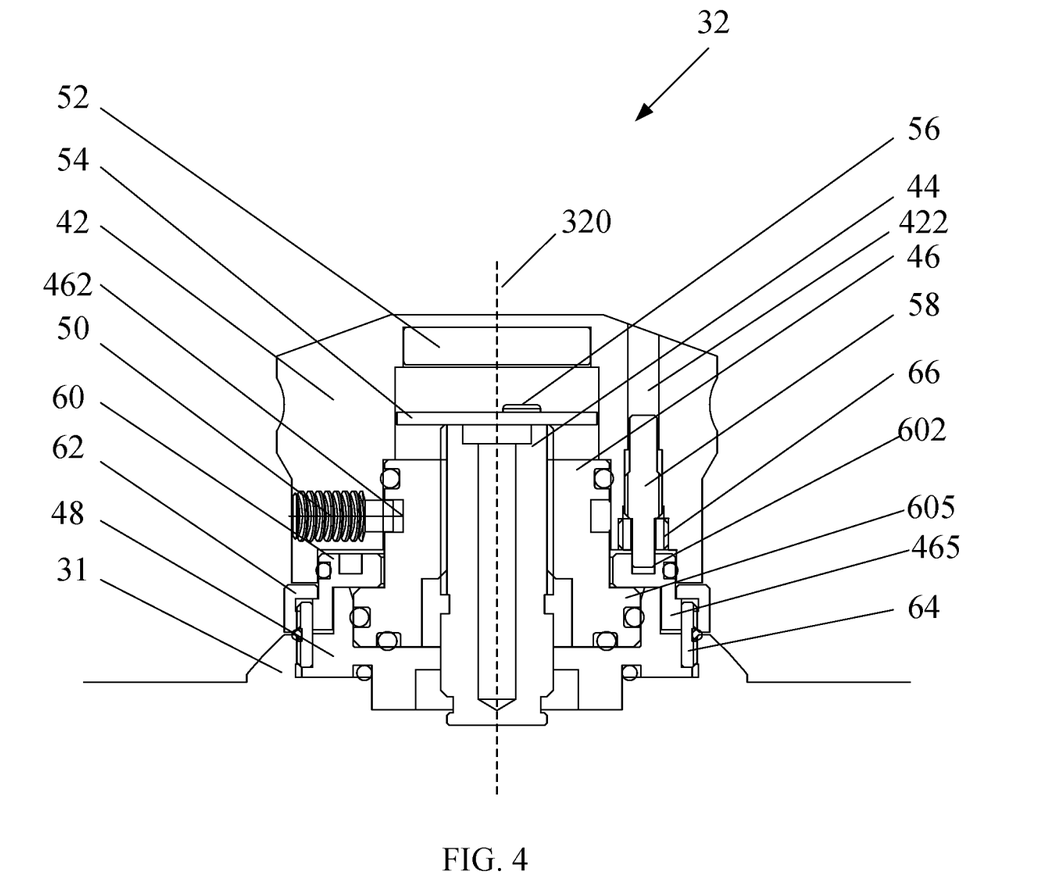
FIG. 4 is a sectional view of a sight adjusting mechanism of a sighting device of the present application.
Figure 5:
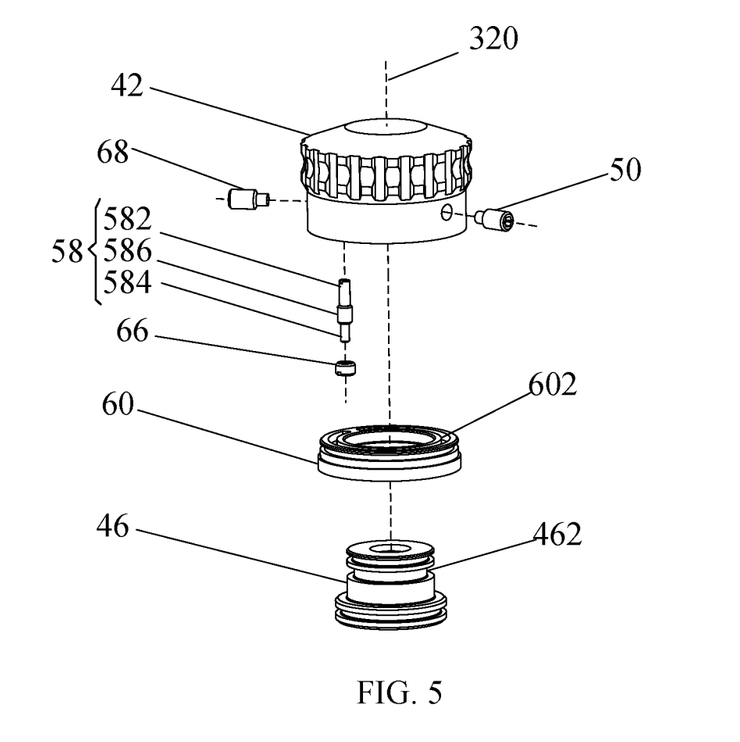
FIG. 5 is a diagram showing a relation between some components in a sight adjusting mechanism of a sighting device of the present application.

FIG. 4 is a longitudinal sectional view of the sight adjusting mechanism 32 of the sighting device 30. Referring to FIG. 3 and FIG. 4 together, the sight adjusting mechanism 32 includes an adjusting knob 42, an adjusting knob 44, an adjusting ring member 46 and a base 48. The base 48 is fastened to the body 31 of the sighting device 30. The adjusting knob 42 couples with the adjusting ring member 46 by means of a fixing fastener 50 (e.g., a screw) such that a linkage between the adjusting knob 42 and the adjusting ring member 46 is formed. That is, the adjusting ring member 46 rotates as the adjusting knob 42 rotates. The adjusting ring member 46 is provided with a first through hole 460. The base 48 is provided with a second through hole 480. The adjusting bolt 44 includes an upper-side portion 441 and a lower-side portion 442. The upper-side portion 441 of the adjusting bolt 44 enters the first through hole 460 of the adjusting ring member 46 to couple with the adjusting ring member 46, and the lower-side portion 442 of the adjusting bolt 44 enters the second through hole 480 of the base 48 to couple with the base 48. When the adjusting knob 42 rotates, the adjusting bolt 44 is only allowed to move along an axis 320 (e.g., upward and downward movements). Specifically, the upper-side portion 441 of the adjusting bolt 44 is screwed together with the adjusting ring member 46, and the lower-side portion 442 of the adjusting bolt 44 is engaged with the base 48. When the rotation of the adjusting knob 42 drives the adjusting ring member 46 to rotate, the screw coupling between the adjusting bolt 44 and the adjusting ring member 46 and the engagement between the adjusting bolt 44 and the base 48 make the adjusting bolt 44 be only able to move along the direction of the axis 320, for example, the adjusting bolt 44 moves upward and downward with respect to the base 48. The lower-side portion 442 of the adjusting bolt 44 abuts on the magnification unit inside the body 31 of the sighting device 30. The upward and downward movements of the adjusting bolt 44 can change the position of the magnification unit such that the sight adjustment is implemented. Such a structure will not produce tactile feedback as the adjusting knob 42 rotates. That is, the sight adjusting mechanism 32 of the sighting device 30 carries out a solution without tactile or mechanical feedback.

Figure 10:
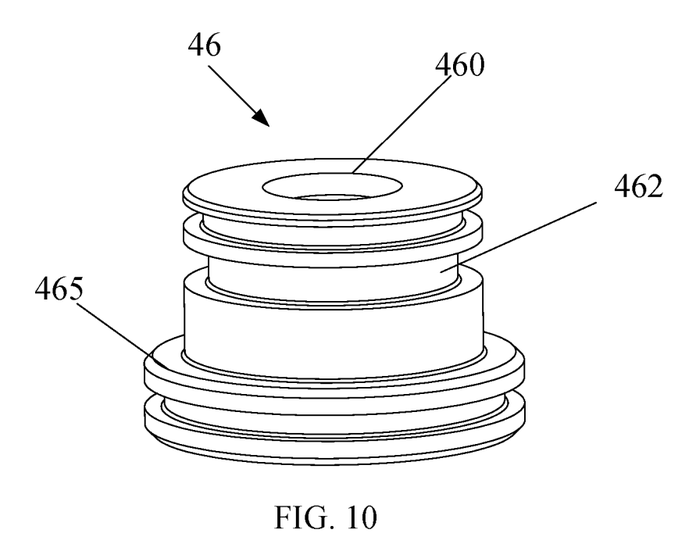
FIG. 10 is a perspective view of an adjusting ring member in a sight adjusting mechanism of a sighting device of the present application.

In an embodiment, the adjusting ring member 46 has a ring slot 462 (see FIG. 10 also), the adjusting knob 42 couples with the adjusting ring member 46 by means of the fixing fastener 50 that abuts on the ring slot 462 of the adjusting ring member 46, and a linkage is formed between the adjusting knob 42 and the adjusting ring member 46. In an embodiment, the adjusting knob 42 couples with the adjusting ring member 46 by means of at least two fixing fasteners 50 that abut on the ring slot 462 of the adjusting ring member 46. In an embodiment, the spacing between the adjusting knob 42 and the base 48 along the direction of the axis 320 is fixed. That is, the rotation of the adjusting knob 42 will not cause the adjusting knob 42 to move upward and downward along the direction of the axis 320. In an embodiment, an external surface of the upper-side portion 441 of the adjusting bolt 44 is adaptive to an inner wall of the adjusting ring member 46 with matched threads. The upper-side portion 441 of the adjusting bolt 44 has an outer thread (not shown), the inner wall of the adjusting ring member 46 has an inner thread (not shown), and the outer thread is adaptive to the inner thread, thereby implementing the screw coupling between the adjusting bolt 44 and the adjusting ring member 46. In an embodiment, a cross-section of the lower-side portion 442 of the adjusting bolt 44 is a polygon, which is adaptive to a contour of the second through hole 480 of the base 480, thereby implementing the engagement between the adjusting bolt 44 and the base 48. Therefore, when the adjusting knob 42 drives the adjusting ring member 46 to rotate, the adjusting bolt 44 will not rotate because of the restriction made by the base 48. Instead, the adjusting bolt 44 moves upward and downward along the axis 320 due to the engagement between the adjusting bolt 44 and the base 48.

The sight adjusting mechanism 32 of the present application is a sight adjusting mechanism without tactile or mechanical feedback. That is, rotating the adjusting knob 42 will not produce tactile feedback. Compared to conventional sighting devices, the sight adjusting mechanism 32 of the present application has the following advantages: (1) the no-tactile-feedback design greatly improves the precision of rotation angle of the adjusting knob 42 of the sight adjusting mechanism 32, and the need of accuracy of sight adjustment is satisfied; (2) the sighting device can have a longer service life since tooth wear occurred between a bullet head and an inner wall of the base in the conventional skills does not happen.

Please refer to FIGS. 5 to 8. The sight adjusting mechanism 32 further includes a limiting member 58 and a positioning ring 60. The adjusting knob 42 has a penetrating hole 422. The limiting member 58 is disposed in the penetrating hole 422 of the adjusting knob 42. The positioning ring 60 is mounted on the adjusting ring member 46. The position of the limiting member 58 with respect to the adjusting knob 42 is adjustable. The limiting member 58 is operable at a first position and a second position along the direction of the axis 320. When the limiting member 58 is located at the first position (see FIG. 7), the limiting member 58 connects with the positioning ring 60 and interaction exists therebetween, and the adjusting knob 42 is restricted to rotate within a range of predetermined angle. When the limiting member 58 is located at the second position (see FIG. 8), the limiting member 58 departs from the positioning ring 60 and interaction does not exist therebetween, and the adjusting knob 42 rotates in an angular range that is greater than the predetermined angle and further, the adjusting knob 42 is allowed to rotate for multiple turns.

Figure 7:
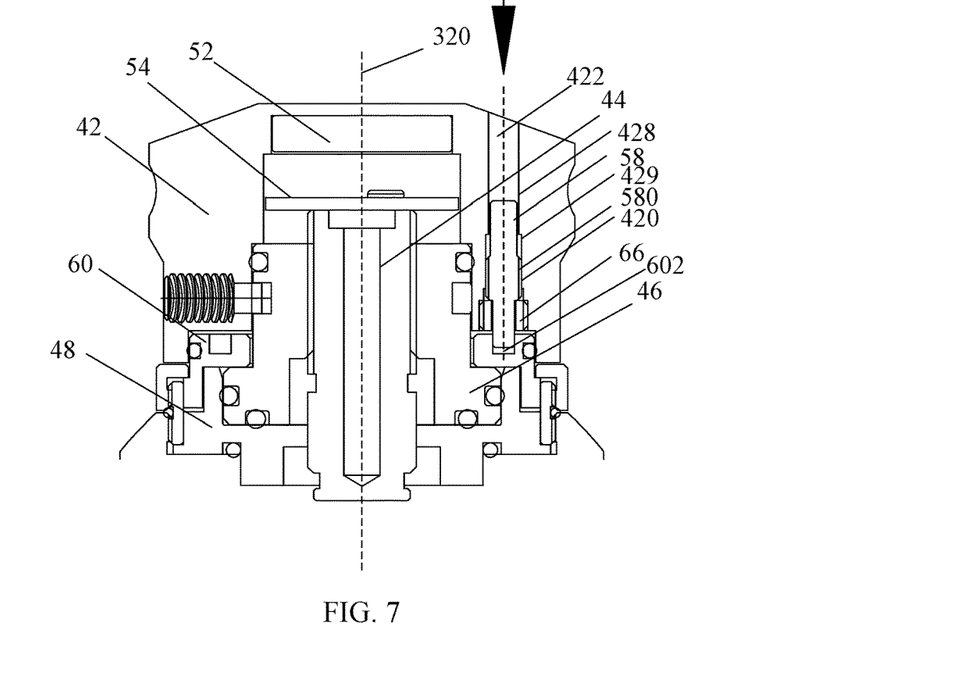
FIG. 7 is a schematic diagram showing a limiting member at a first position in a sight adjusting mechanism of a sighting device of the present application.
Figure 8:
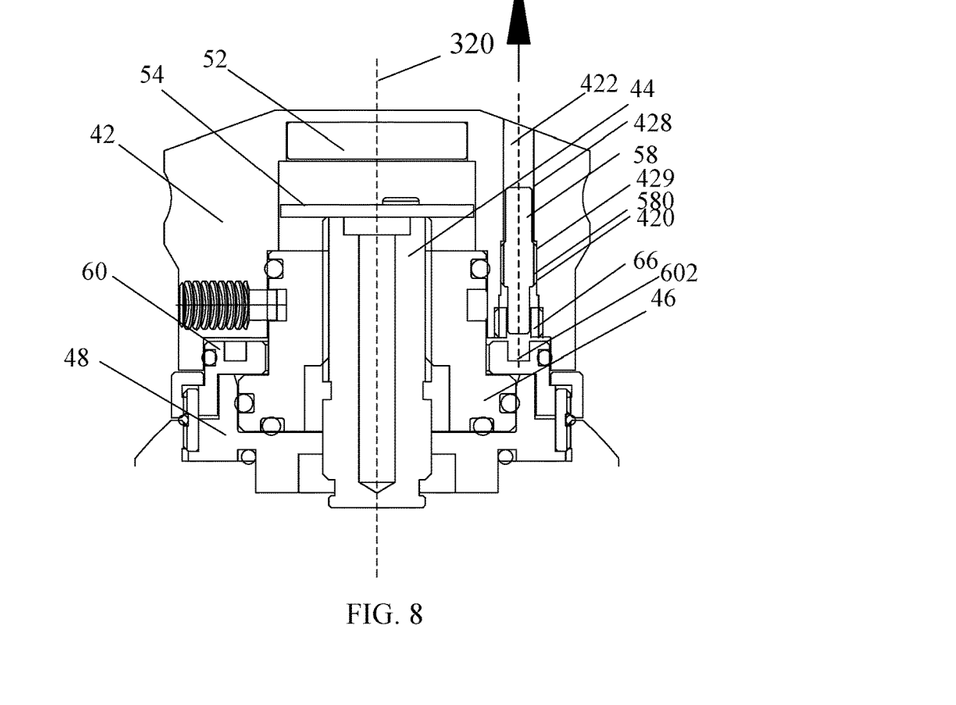
FIG. 8 is a schematic diagram showing a limiting member at a second position in a sight adjusting mechanism of a sighting device of the present application.

When the limiting member 58 operates at the first position (e.g., the limiting member 58 is moved downward to connect with the positioning ring 60), the movement of the limiting member 58 is restricted by the positioning ring 60. In this way, the rotatable angle of the adjusting knob 42 is limited. The adjusting knob 42 is only allowed to rotate within the range of predetermined angle. This is beneficial for a fine adjustment of a sight point. When the limiting member 58 operates at the second position (e.g., the limiting member 58 is moved upward to depart from the positioning ring 60), the movement of the limiting member 58 will be not interfered by the positioning ring 60. In this way, the adjusting knob 42 rotates in an angular range that is greater than the predetermined angle. The adjusting knob 42 may be further allowed to rotate for multiple turns. Therefore, a quick adjustment of a sight point can be performed when it needs to adjust the sight point on a large scale. This structure design is also beneficial to zero reset and zero stop, which will be described in details later.

Figure 6:
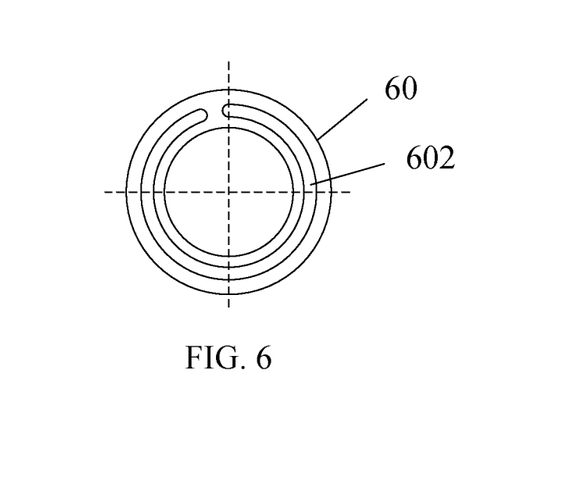
FIG. 6 is a top view of a positioning ring in a sight adjusting mechanism of a sighting device of the present application.

In an embodiment, the positioning ring 60 has a positioning slot 602. For example, the positioning slot 602 is a slot formed on a top face of the positioning ring 60. The positioning slot 602 defines the range of angle (i.e., the predetermined angle) within which the adjusting knob 42 is rotatable. The predetermined angle is less than or equal to 360 degrees. When the position of the limiting member 58 falls in the positioning slot 602 of the positioning ring 60, the limiting member 58 connects with the positioning ring 60 and interaction exists therebetween, and the adjusting knob 42 is only allowed to rotate within the range of predetermined angle defined by the positioning slot 602 of the positioning ring 60. When the position of the limiting member 58 is out of the positioning slot 602 of the positioning ring 60, the limiting member 58 departs from the positioning ring 60 and interaction does not exist therebetween. Meanwhile, the rotation of the adjusting knob 42 will not be affected by the positioning slot 602 of the positioning ring 60, and the adjusting knob 42 rotates in an angular range that is greater than the predetermined angle or the adjusting knob 42 is allowed to rotate for multiple turns.

In an embodiment, the penetrating hole 422 of the adjusting knob 42 penetrates the adjusting knob 42 in longitudinal direction, that is, penetrating the adjusting knob 42 along the direction of the axis of the positioning ring 60. In an embodiment, when the adjusting knob 42 drives the adjusting ring member 46 to rotate, the spacing between the adjusting knob 42 and the base 48 and the limiting member 58 and the base 48 along the direction of the axis 320 is fixed. That is, the rotation of the adjusting knob 42 will not cause a change of the spacing along the direction of the axis 320 for the adjusting knob 42 and the limiting member 58. In an embodiment, the sight adjusting mechanism 32 further includes a stop ring 66, which is disposed between the limiting member 58 and the positioning ring 60. The limiting member 58 includes an upper end portion 582 and a lower end portion 584. The lower end portion 584 is disposed in the stop ring 66. When the limiting member 58 operates along the direction of the axis 320 (e.g., the limiting member 58 is moved downward along the axis 320), the first position is indicated by a situation that the lower end portion 584 of the limiting member 58 is protruded from the stop ring 66 (see FIG. 7), and at the first position the limiting member 58 connects with the positioning ring 60 and interacts with the positioning ring 60; conversely, when the limiting member 58 operates along the direction of the axis 320 (e.g., the limiting member 58 is moved upward along the axis 320), the second position is indicated by a situation that the lower end portion 584 of the limiting member 58 is not protruded from the stop ring 66 (see FIG. 8), and at the second position the limiting member 58 departs from the positioning ring 60 without an interaction with the positioning ring 60.

In an embodiment, the limiting member 58 further includes a middle end portion 586 located between the upper end portion 582 and the lower end portion 584. The penetrating hole 422 disposed in the adjusting knob 42 includes an upper segment 428 and a lower segment 429. The middle end portion 586 of the limiting member 58 has a first connection part 580 and the lower segment 429 of the penetrating hole 422 has a second connection part 420. The first connection part 580 and the second connection part 420 are disposed correspondingly and are adaptive to each other such that the middle end portion 586 of the limiting member 58 couples with the lower segment 429 of the penetrating hole 422 (e.g., by screw coupling). The first connection part 580 of the middle end portion 586 of the limiting member 58 is only allowed to be operatively moved along the direction of the axis 320 within the range of the second connection part 420 of the lower segment 429 such that the middle end portion 586 of the limiting member 58 keeps within the range of the lower segment 429 of the penetrating hole 422 without departing from the penetrating hole 422 when the limiting member 58 is operatively moved along the direction of the axis 320. In an embodiment, an outer radius of the middle end portion 586 of the limiting member 58 is greater than the outer radius of the upper end portion 582 and the lower end portion 584 and an inner radius of the stop ring 66, and therefore the movement of the middle end portion 586 of the limiting member 58 will not exceed the stop ring 66. The first connection part 580 of the middle end portion 586 of the limiting member 58 is a first thread segment (not shown). The second connection part 420 of the lower segment 429 of the penetrating hole 422 is a second thread segment (not shown). The first thread segment is adaptive to the second thread segment. The first thread segment is allowed to be operatively moved along the direction of the axis 320 within the range of the second thread segment such that the limiting member 58 keeps between the lower segment 429 of the penetrating hole 422 and the stop ring 66 when the limiting member 58 operates along the direction of the axis 320. In an assembling aspect, the limiting member 58 is installed from a bottom side of the penetrating hole 422 of the adjusting knob 42 such that the first thread segment on the first connection part 580 of the limiting member 58 couples with the second thread segment on the second connection part 420 of the penetrating hole 422. Then, the stop ring 66 mounts on the lower segment 429 of the penetrating hole 422. The stop ring 66 may be fixed on the adjusting knob 42 (by screw coupling or engagement). In such a way, assembling the limiting member 58 and the stop ring 66 to the adjusting knob 42 is completed.

The sight adjusting mechanism 32 further includes a magnetic component 52, a circuit board 54 and a magnetic sensor 56 disposed on the circuit board 54. The magnetic component (e.g., a permanent magnet) 52 is disposed on an inner face (e.g., an inner top face) of the adjusting knob 42. The circuit board 54 is disposed on the upper-side portion 441 of the adjusting bolt 44, for example, on a top face of the upper-side portion 441. As described above, the rotation of the adjusting knob 42 will make the adjusting bolt 44 move upward or downward. The movement of the adjusting bolt 44 will cause a change of relative position between the magnetic sensor (e.g., a rotary Hall-effect sensor) 56 on the circuit board 54 and the magnetic component 52 such that the magnetic sensor 56 senses a change of magnetic field of the magnetic component 52. When the adjusting knob 42 rotates, the magnetic sensor 56 senses different magnetic fields. After a certain amount of computations, it can be obtained a rotated angle and the number of turns of the adjusting knob 42. The precision on the rotated angle detected by the magnetic sensor 56 can reach 0.01 degree, which is much higher than a resolution of 3.6 degrees carried out by the conventional sighting device. Such information can be applied to a calculation on trajectory compensation, for example, and is presented in the end on the sighting device 30 via a display. Therefore, based on the obtained rotation angle and the number of turns from the magnetic sensing technology, a user perceives feedback when operating the adjusting knob 42 and this gives much technical feeling for the sighting device 30.

In an embodiment, the magnetic component 52 is shaped as a circular disk, is fixed on an inner top face of the adjusting knob 42 and moves along with the adjusting knob 42. As a result, the magnetic field of the magnetic component 52 has no substantial change when the adjusting knob 42 rotates. In an embodiment, the magnetic sensor 56 is disposed on the circuit board 54, and the circuit board 54 is disposed on a top face of the upper-side portion 441 of the adjusting bolt 44. In an embodiment, the position where the magnetic sensor 56 is on the circuit board 54 deviates from a rotation axis of the adjusting bolt 44. In another embodiment, the position where the magnetic sensor 56 is on the circuit board 54 is located on the rotation axis of the adjusting bolt 44, that is, the magnetic sensor 56 is disposed at a central position. It is noted that the magnetic sensor 56 is not limited to be disposed at the central position, and a position deviating from the central position is applicable as well. In addition, it is not limited by the number of the magnetic sensors 56.

The sight adjusting mechanism further includes a first retaining ring 62 and a second retaining ring 64. The adjusting ring member 46 has a ring flange 465. The positioning ring 60 has a positioning flange 605. The positioning ring 60 abuts on the ring flange 465 of the adjusting ring member 46. The first ring flange 62 abuts on the positioning flange 605 of the positioning ring 60. The base 48 receives the ring flange 465 of the adjusting ring member 46. The second retaining ring 64 is disposed between the base 48 and the body 31 and is disposed between the base 48 and the first retaining ring 31. This structure with components linked with one another can improve the stability of the sight adjusting mechanism 32, especially for the stability of movement of the adjusting ring member 46. The following order can be used in the assembling: the base 48, the second retaining ring 64, the adjusting ring member 46, the positioning ring 60 and the first retaining ring 62.

Figure 9:
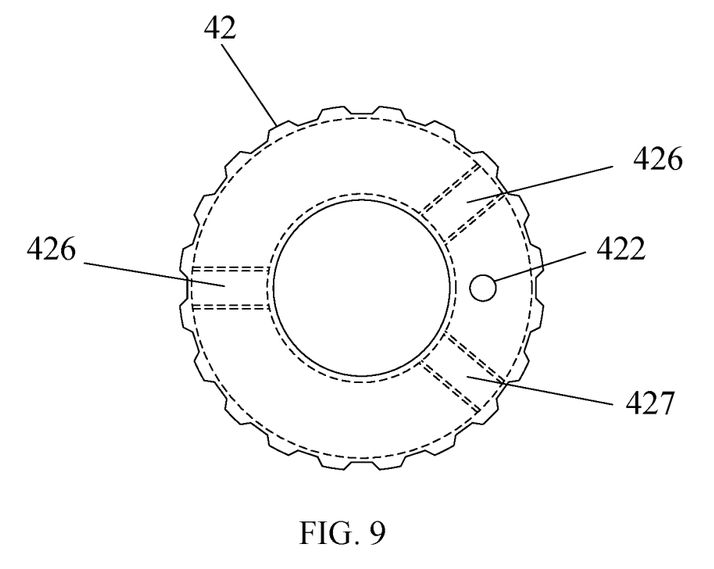
FIG. 9 is a sectional view of an adjusting knob in a sight adjusting mechanism of a sighting device of the present application.

Please refer to FIG. 3, FIG. 4 and FIG. 9. Three fasteners may be used to combine the adjusting knob 42 and the adjusting ring member 46. For example, these fasteners include two fixing fasteners 50 and one limiting fastener 68. The two fixing fasteners 50 are disposed corresponding to fixing fastener lockholes 426 on the adjusting knob 42 and are used to fasten the adjusting knob 42 and the adjusting ring member 46 together such that a linkage between the lock holes adjusting knob 42 and the adjusting ring member 46 is formed. An included angle may be formed by the two fixing fasteners 50 such that the two fixing fasteners 50 abuts on the ring slot 462 (see FIG. 10) of the adjusting ring member 46 and apply different directions of forces to the adjusting ring member 46, thereby fixing the adjusting ring member 46 to the adjusting knob 42. Furthermore, the limiting fastener is disposed corresponding to a limiting fastener lockhole 427 on the adjusting knob 42 and is used to limit the adjusting knob 42 such that the rotation of the adjusting knob 42 is kept on the adjusting ring member 46. Specifically, the limiting fastener 68 extends to the ring slot 462 of the adjusting ring member 46 but cannot abut on the ring slot 462. That is, a gap always exists between the limiting fastener 68 and a wall of the ring slot 462. Therefore, when the two fixing fasteners 50 are loosed, the rotation of the adjusting knob 42 will not drive the adjusting ring member 46. Instead, the adjusting knob 42 rotates along the ring slot 462 of the adjusting ring member 46 by means of the limiting fastener 68.

The operations of zero reset and zero stop will be described below. When the sighting device 30 combines with a shooting equipment and shooting is to be carried out under a reset zero point, the following operations can be used to find the position of the reset zero point. At the beginning, the adjusting knob 42 and the adjusting ring member 46 are fastened together by using (two) fixing fasteners 50, that is, the fasteners are in a locked state. Next, the limiting member 58 is retracted to a position where the limiting member 58 does not connect with the positioning ring 60. Meanwhile, the adjusting knob 42 can rotate for multiple turns. The adjusting knob 42 is rotated for finding the position of the reset zero point. Since the adjusting knob 42 is rotatable for multiple turns, the range the sight point can be moved is larger. Therefore, the position of the reset zero point can be found quickly. After the position of the reset zero point is found, the position of the reset zero point can be locked and corresponding operations are described below. The (two) fixing fasteners 50 are loosed. At this moment, the rotation of the adjusting knob 42 will not drive the adjusting ring member 46. Instead, with the help of the limiting fastener 68, the adjusting knob 42 rotates with respect to the adjusting ring member 46. Next, the limiting member 58 is operatively moved to a position where the limiting member 58 connects with the positioning ring 60, that is, the limiting member 58 falls in the positioning slot 602 of the positioning ring 60. Then, the adjusting knob 42 is rotated such that the limiting member 58 abuts closely on one side of the positioning slot 602 of the positioning ring 60. Finally, the (two) fixing fasteners 50 are used to fasten the adjusting knob 42 to the adjusting ring member 46. In this way, locking the position of the reset zero point is completed. Therefore, the position of the reset zero point is locked to the one side of the positioning slot 602, and one may quickly return to the reset zero point by rotating the adjusting knob 42 to the end.

While the preferred embodiments of the present application have been illustrated and described in detail, various modifications and alterations can be made by persons skilled in this art. The embodiment of the present application is therefore described in an illustrative but not restrictive sense.

It is intended that the present application should not be limited to the particular forms as illustrated, and that all modifications and alterations which maintain the spirit and realm of the present application are within the scope as defined in the appended claims.

What is claimed is:

1. A sight adjusting mechanism, comprising:
    an adjusting knob, having a penetrating hole;
    an adjusting ring member, having a first through hole, wherein the adjusting knob couples with the adjusting ring member by means of a fixing fastener;
    a base, having a second through hole;
    an adjusting bolt, comprising an upper-side portion and a lower-side portion, wherein the upper-side portion of the adjusting bolt enters the first through hole of the adjusting ring member to couple with the adjusting ring member and the lower-side portion of the adjusting bolt enters the second through hole of the base to couple with the base such that the adjusting bolt can only move along an axis during the adjusting knob rotates;
    a limiting member, disposed in the penetrating hole of the adjusting knob; and
    a positioning ring, mounted on the adjusting ring member, wherein the limiting member is operable at a first position and a second position along the direction of the axis, the limiting member connects with the positioning ring and the adjusting knob is restricted to rotate within a range of predetermined angle when the limiting member is located at the first position, and the limiting member departs from the positioning ring and the adjusting knob rotates in an angular range that is greater than the predetermined angle when the limiting member is located at the second position.

2. The sight adjusting mechanism of claim 1, wherein the upper-side portion of the adjusting bolt enters the first through hole of the adjusting ring member to be screwed together with the adjusting ring member, and an external surface of the upper-side portion of the adjusting bolt is adaptive to an inner wall of the adjusting ring member with matched threads.

3. The sight adjusting mechanism of claim 1, wherein the lower-side portion of the adjusting bolt enters the second through hole of the base to be engaged with the base, and a cross-section of the lower-side portion of the adjusting bolt is a polygon, which is adaptive to a contour of the second through hole of the base.

4. The sight adjusting mechanism of claim 1, wherein the adjusting ring member has a ring slot, the adjusting knob couples with the adjusting ring member by means of the fixing fastener that abuts on the ring slot of the adjusting ring member, and a linkage is formed between the adjusting knob and the adjusting ring member.

5. The sight adjusting mechanism of claim 1, wherein when the adjusting knob drives the adjusting ring member to rotate, the adjusting knob and the limiting member have fixed spacing in the direction of the axis with respect to the base.

6. The sight adjusting mechanism of claim 1, wherein a spacing between the adjusting knob and the base along the direction of the axis is fixed; and the predetermined angle is less than or equal to 360 degrees.

7. The sight adjusting mechanism of claim 1, further comprising:
    a stop ring, disposed between the limiting member and the positioning ring, wherein the limiting member comprises an upper end portion and a lower end portion, the lower end portion is disposed in the stop ring, and wherein when the limiting member operates along the direction of the axis, the first position is indicated by a situation that the lower end portion of the limiting member is protruded from the stop ring, and at the first position the limiting member connects with the positioning ring; conversely, the second position is indicated by a situation that the lower end portion of the limiting member is not protruded from the stop ring, and at the second position the limiting member departs from the positioning ring.

8. The sight adjusting mechanism of claim 5, further comprising:
   a stop ring, disposed between the limiting member and the positioning ring, wherein the limiting member comprises an upper end portion and a lower end portion, the lower end portion is disposed in the stop ring, and wherein when the limiting member operates along the direction of the axis, the first position is indicated by a situation that the lower end portion of the limiting member is protruded from the stop ring, and at the first position the limiting member connects with the positioning ring; conversely, the second position is indicated by a situation that the lower end portion of the limiting member is not protruded from the stop ring, and at the second position the limiting member departs from the positioning ring.

9. The sight adjusting mechanism of claim 6, further comprising:
   a stop ring, disposed between the limiting member and the positioning ring, wherein the limiting member comprises an upper end portion and a lower end portion, the lower end portion is disposed in the stop ring, and wherein when the limiting member operates along the direction of the axis, the first position is indicated by a situation that the lower end portion of the limiting member is protruded from the stop ring, and at the first position the limiting member connects with the positioning ring; conversely, the second position is indicated by a situation that the lower end portion of the limiting member is not protruded from the stop ring, and at the second position the limiting member departs from the positioning ring.

10. The sight adjusting mechanism of claim 7, wherein the limiting member further has a middle end portion located between the upper end portion and the lower end portion, the middle end portion has a first connection part, the penetrating hole comprises an upper segment and a lower segment, the lower segment has a second connection part, the middle end portion of the limiting member connects with the lower segment of the penetrating hole, and wherein the first connection part is only allowed to be operatively moved along the direction of the axis within the range of the second connection part such that the middle end portion of the limiting member keeps within the range of the lower segment of the penetrating hole without departing from the penetrating hole when the limiting member is operatively moved along the direction of the axis.

11. The sight adjusting mechanism of claim 9, wherein the limiting member further has a middle end portion located between the upper end portion and the lower end portion, the middle end portion has a first connection part, the penetrating hole comprises an upper segment and a lower segment, the lower segment has a second connection part, the middle end portion of the limiting member connects with the lower segment of the penetrating hole, and wherein the first connection part is only allowed to be operatively moved along the direction of the axis within the range of the second connection part such that the middle end portion of the limiting member keeps within the range of the lower segment of the penetrating hole without departing from the penetrating hole when the limiting member is operatively moved along the direction of the axis.

12. The sight adjusting mechanism of claim 10, wherein an outer radius of the middle end portion of the limiting member is greater than the outer radius of the upper end portion and the lower end portion and an inner radius of the stop ring.

13. The sight adjusting mechanism of claim 11, wherein an outer radius of the middle end portion of the limiting member is greater than the outer radius of the upper end portion and the lower end portion and an inner radius of the stop ring.

14. The sight adjusting mechanism of claim 10, wherein the first connection part is a first thread segment, wherein the second connection part is a second thread segment, and wherein the first thread segment is allowed to be operatively moved along the direction of the axis within the range of the second thread segment such that the limiting member keeps between the lower segment of the penetrating hole and the stop ring when the limiting member operates along the direction of the axis.

15. The sight adjusting mechanism of claim 11, wherein the first connection part is a first thread segment, wherein the second connection part is a second thread segment, and wherein the first thread segment is allowed to be operatively moved along the direction of the axis within the range of the second thread segment such that the limiting member keeps between the lower segment of the penetrating hole and the stop ring when the limiting member operates along the direction of the axis.

16. The sight adjusting mechanism of claim 1, further comprising:
   a circuit board, disposed on the upper-side portion of the adjusting bolt;
   a magnetic sensor, disposed on the circuit board; and
   a magnetic component, disposed on an inner face of the adjusting knob,
   wherein when the rotation of the adjusting knob drives the adjusting bolt to move, relative position between the magnetic sensor on the circuit board and the magnetic component is changed such that the magnetic sensor senses a change of magnetic field of the magnetic component.

17. The sight adjusting mechanism of claim 1, wherein the positioning ring has a positioning slot, the positioning slot defines the range of predetermined angle within which the adjusting knob is rotatable, and wherein when the position of the limiting member falls in the positioning slot of the positioning ring, the limiting member connects with the positioning ring.

18. The sight adjusting mechanism of claim 4, further comprising:
   a limiting fastener, extending to the ring slot of the adjusting ring member, wherein a gap exists between the limiting fastener and a wall of the ring slot, and the limiting fastener is configured to limit the movement of the adjusting knob such that the rotation of the adjusting knob is kept on the adjusting ring member.

19. The sight adjusting mechanism of claim 1, wherein the adjusting ring member has a ring flange, the base receives the ring flange of the adjusting ring member, the positioning ring has a positioning flange, the positioning ring abuts on the ring flange of the adjusting ring member.

20. The sight adjusting mechanism of claim 19, further comprising:
- a first retaining ring, abutting on the positioning flange of the positioning ring; and
- a second retaining ring, disposed between the base and the first retaining ring.

* * * * *